N. JOHNSON.
Improvement in Circular-Saw Teeth.
No. 127,061.  Patented May 21, 1872.
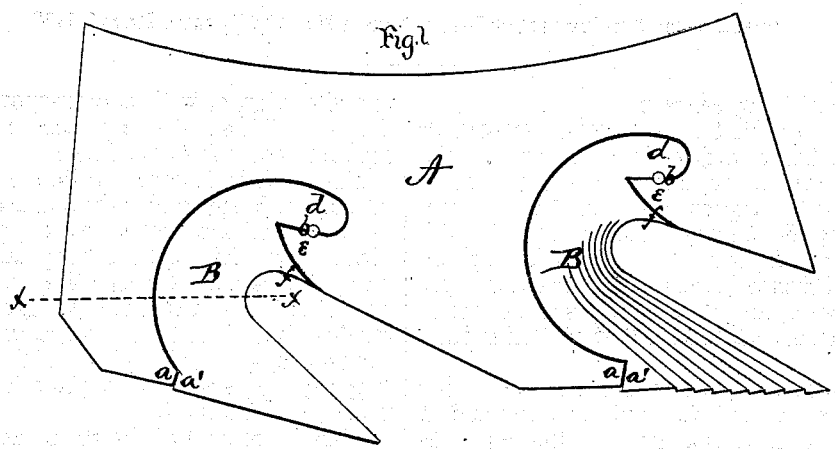
Witnesses
James E. Hutchinson
C. N. Evert
Inventor
Nelson Johnson
per
Hander Mason
Attorneys.

127,061

UNITED STATES PATENT OFFICE.

NELSON JOHNSON, OF JASPER, NEW YORK.

IMPROVEMENT IN CIRCULAR-SAW TEETH.

Specification forming part of Letters Patent No. 127,061, dated May 21, 1872.

*To all whom it may concern:*

Be it known that I, NELSON JOHNSON, of Jasper, in the county of Steuben and in the State of New York, have invented certain new and useful Improvements in Circular-Saw Teeth; and do hereby declare that the following is a full, clear, and exact description thereof, reference being had to the accompanying drawing and to the letters of reference marked thereon making a part of this specification.

The nature of my invention consists in the construction of teeth for circular saws and in the mode of fastening them to the plate, as will be hereinafter more fully set forth.

In order to enable others skilled in the art to which my invention appertains to make and use the same, I will now proceed to describe its construction and operation, referring to the annexed drawing, in which—

Figure 1 is a side view of a portion of a circular saw showing two of my teeth in position in the plate, and Fig. 2 is a section through line *x x* of Fig. 1.

A represents the saw-blade or plate of a circular saw; and B B, two of the teeth inserted in the same. The teeth B B are constructed substantially as shown in the drawing, with corresponding recesses cut in the plate A, and the edge of that portion of each saw which comes in contact with the edge of the recess cut in the plate, is grooved, as shown in Fig. 2, while the edge of the recess mentioned is V-shaped to fit in said groove. At the back of the saw-tooth, on the edge of the plate A, is a shoulder, *a*, with a corresponding shoulder, *a'*, in the saw-tooth, which shoulders bear against each other, as shown.

The tooth is fastened in its place by means of a rivet, *b*, inserted between a lip, *d*, at the inner end of the tooth, and a part, *e*, of the plate A, and this part *e* of the plate is supported by another lip, *f*, projecting from the inner portion of the saw-tooth, so that the entire strain of the rivet is both ways, virtually upon the saw-tooth itself, the lip *f* of the tooth overlapping the part *e* of the plate far enough to be beyond the rivet.

Heretofore part of the strain has invariably been borne by the plate, which has a tendency to make the saw run untrue and not steady. This is entirely obviated by my method of so constructing the tooth that the strain will be on the tooth itself and not on the plate.

Having thus fully described my invention, what I claim as new, and desire to secure by Letters Patent, is—

The plate A, provided with lip *e*, in combination with the tooth B, having lips *d f*, and the rivet *b*, when constructed as described, so that the strain of the rivet will be on the tooth both ways, substantially as herein set forth.

In testimony that I claim the foregoing I have hereunto set my hand this 19th day of March, 1872.

NELSON JOHNSON.

Witnesses:
 C. L. EVERT,
 J. M. MASON.